United States Patent
Rodrigues et al.

(10) Patent No.: US 11,971,921 B2
(45) Date of Patent: Apr. 30, 2024

(54) COMPREHENSIBILITY-BASED IDENTIFICATION OF EDUCATIONAL CONTENT OF MULTIPLE CONTENT TYPES

(71) Applicant: GOOGLE LLC, Mountain View, CA (US)

(72) Inventors: Arthur Rodrigues, Belo Horizonte (BR); Mindy Brooks, Mountain View, CA (US); Rafael Dantas De Castro, San Francisco, CA (US); Sonia Franckel, San Francisco, CA (US); Bruno Diniz de Paula, Belo Horizonte (BR)

(73) Assignee: Google LLC, Mountain View, CA (US)

( * ) Notice: Subject to any disclaimer, the term of this patent is extended or adjusted under 35 U.S.C. 154(b) by 225 days.

(21) Appl. No.: 17/428,481

(22) PCT Filed: Mar. 1, 2019

(86) PCT No.: PCT/US2019/020359
§ 371 (c)(1),
(2) Date: Aug. 4, 2021

(87) PCT Pub. No.: WO2020/162950
PCT Pub. Date: Aug. 13, 2020

(65) Prior Publication Data
US 2022/0114205 A1    Apr. 14, 2022

Related U.S. Application Data

(60) Provisional application No. 62/801,617, filed on Feb. 5, 2019.

(51) Int. Cl.
*G06F 16/00* (2019.01)
*G06F 9/451* (2018.01)
(Continued)

(52) U.S. Cl.
CPC ............ *G06F 16/438* (2019.01); *G06F 9/451* (2018.02); *G06F 16/24578* (2019.01);
(Continued)

(58) Field of Classification Search
CPC ................. G06F 16/438; G06F 16/435; G06F 16/24578; G06F 16/447; G06F 16/9535;
(Continued)

(56) References Cited

U.S. PATENT DOCUMENTS 10,366,343 B1 * 7/2019 Zappella ............. G06F 16/9024
10,789,622 B2 * 9/2020 Ayush ................. G06F 18/2132
(Continued)

FOREIGN PATENT DOCUMENTS

WO    WO2018013385 A1 *  1/2018
WO    WO2017114287 A1 *  4/2020

OTHER PUBLICATIONS

Jiehao Chen et al., "A top-N recommendation model Based on feedback learning to rank and online learning", IEEE 2nd Advanced Information Technology, Electronic and Automation Control Conference (IAEAC) Mar. 2017, (pp. 384-389).*
(Continued)

*Primary Examiner* — Srirama Channavajjala
(74) *Attorney, Agent, or Firm* — Lowenstein Sandler LLP

(57) ABSTRACT

Implementations disclose comprehensibility-based identification of educational content of multiple content types. A method includes determining respective comprehensibility ranking signals for content items corresponding to a user request, the comprehensibility ranking signals based on learning attribute scores generated for the content items from at least one machine learning model, determining a learning level of a user corresponding to the user request, ranking the content items based on a mapping between the learning level and the respective comprehensibility ranking
(Continued)

signals of the content items, and providing a recommendation for the content items according to the ranking of the content items.

21 Claims, 9 Drawing Sheets

(51) Int. Cl.
| | | |
|---|---|---|
| *G06F 16/2457* | (2019.01) | |
| *G06F 16/335* | (2019.01) | |
| *G06F 16/438* | (2019.01) | |
| *G06F 16/44* | (2019.01) | |
| *G06F 16/901* | (2019.01) | |
| *G06F 16/9535* | (2019.01) | |
| *G06F 16/954* | (2019.01) | |
| *G06N 3/00* | (2023.01) | |
| *G06N 3/006* | (2023.01) | |
| *G06N 3/043* | (2023.01) | |
| *G06N 20/00* | (2019.01) | |

(52) U.S. Cl.
CPC .......... *G06F 16/337* (2019.01); *G06F 16/447* (2019.01); *G06F 16/9024* (2019.01); *G06F 16/9535* (2019.01); *G06F 16/954* (2019.01); *G06N 3/006* (2013.01); *G06N 3/043* (2023.01); *G06N 20/00* (2019.01)

(58) Field of Classification Search
CPC ...... G06F 16/43; G06F 16/637; G06F 16/954; G06F 16/35; G06F 9/451; G06F 40/253; G06F 16/337; G06F 16/9024; G06N 20/00; G06N 3/088; G06N 3/08; G06N 5/04; G06N 5/048; G06N 3/006; G06N 3/043; G06V 20/70
See application file for complete search history.

(56) References Cited

U.S. PATENT DOCUMENTS

| | | | | |
|---|---|---|---|---|
| 2009/0187550 | A1* | 7/2009 | Mowatt | G06F 16/24578 707/999.005 |
| 2013/0238608 | A1* | 9/2013 | Sia | G06F 16/334 707/723 |
| 2013/0290339 | A1 | 10/2013 | LuVogt et al. | |
| 2015/0206441 | A1 | 7/2015 | Brown | |
| 2016/0014440 | A1* | 1/2016 | Cortes | G06V 20/40 725/18 |
| 2016/0029155 | A1 | 1/2016 | Kerr et al. | |
| 2016/0188725 | A1* | 6/2016 | Wang | G06F 16/9535 707/734 |
| 2017/0061286 | A1* | 3/2017 | Kumar | G06Q 30/0269 |
| 2018/0253661 | A1* | 9/2018 | Strauss | G06N 20/00 |
| 2019/0147108 | A1* | 5/2019 | Liu | G06N 5/041 707/706 |
| 2020/0201915 | A1* | 6/2020 | Pathak | G06N 3/084 |
| 2021/0125108 | A1* | 4/2021 | Metzler, Jr. | G06F 16/93 |

OTHER PUBLICATIONS

Hongbo Chen et al., "A Ranked-Based Learning Approach to Automated Essay Scoring", 2012 Second International Conference on Cloud and Green Computing (Page(s): Nov. 2012, (448-455).*
PCT International Search Report and Written Opinion for International Application No. PCT/US2019/020359, dated Oct. 9, 2019, 17 pages.
COLONELPANIC: "Browser Plugins vs Extensions—the difference", Internet Citation, Aug. 10, 2010 (Aug. 10, 2010), 4 pages, XP002738290, Retrieved from the Internet: URL:http://colonelpanic.net/2010/08/browser-plugins-vs-extensions-the-difference/ [retrieved on Oct. 4, 2015].
Kim et al., "Characterizing Web Content, User Interests, and Search Behavior by Reading Level and Topic," WSDM'12, Feb. 8-12, 2012, Seattle, Washington, USA. pp. 212-222.
Jameel et al., "An Unsupervised Ranking Method Based on a Technical Difficulty Terrain," CIKM'11, Oct. 24-28, 2011, Glasgow, Scotland, UK, pp. 1989-1992.
Tan et al., "To Each His Own: Personalized Content Selection based on Text Comprehensibility," WSDM'12, Feb. 8-12, 2012, Seattle, Washington, USA, pp. 233-242.

* cited by examiner

200 

Determine respective comprehensibility ranking signals for content items corresponding to a user request, the comprehensibility ranking signals based on learning attribute scores generated for the content items from at least one machine learning model
210

Determine a learning level of a user corresponding to the user request
220

Rank the content items based on a mapping between the learning level and the respective comprehensibility ranking signals of the content items
230

Provide a recommendation for the content items according to the ranking of the content items
240

Receive a request for a comprehensibility ranking signal for a content item
410

For each learning level: 420

Apply one or more ML models for each of a plurality of learning attributes to the content item to generate a learning attribute score for each learning attribute at the respective learning level
422

Combine generated learning attribute scores from the ML models into a final comprehensibility ranking signal of the content item at the respective learning level
424

Return generated individual learning attribute scores and final comprehensibility ranking signal for the content item at each learning level
430

Store generated individual learning attribute scores and final comprehensibility ranking signal for the content item at each learning level
440

```
┌─────────────────────────────────────────────────────────────────────┐
│ Receive a request for a comprehensibility ranking signal for a      │
│ content item being placed in a learning tree                        │
│                                                                 460 │
└─────────────────────────────────────────────────────────────────────┘
                                   ▼
┌─────────────────────────────────────────────────────────────────────┐
│ Apply ML models to the content item to generate comprehensibility   │
│ ranking signal for the content item at each learning level          │
│                                                                 470 │
└─────────────────────────────────────────────────────────────────────┘
                                   ▼
┌─────────────────────────────────────────────────────────────────────┐
│ Determine highest generated comprehensibility ranking signal for    │
│ the content item among the learning levels                          │
│                                                                 480 │
└─────────────────────────────────────────────────────────────────────┘
                                   ▼
┌─────────────────────────────────────────────────────────────────────┐
│ Place content item in the learning tree at a learning level         │
│ corresponding to the determined learning level                      │
│                                                                 490 │
└─────────────────────────────────────────────────────────────────────┘
```

```
┌─────────────────────────────────────────────────────────────────────────┐
│ Obtain sample content items having metadata indicating an identified learning │
│              level and an educational topical fit                         │
│                                                                    510   │
└─────────────────────────────────────────────────────────────────────────┘
                                    │
                                    ▼
┌─────────────────────────────────────────────────────────────────────────┐
│ For each learning level, obtain manual ratings for the sample content items │
│ with respect to different learning attributes including appeal, depth, sparkability, │
│         learning impact, and developmental appropriateness               │
│                                                                    520   │
└─────────────────────────────────────────────────────────────────────────┘
                                    │
                                    ▼
┌─────────────────────────────────────────────────────────────────────────┐
│ Training ML models using training data including features of the metadata and │
│  labels of the manual ratings, the ML models trained for each of the learning │
│    attributes including appeal, depth, sparkability, learning impact, and │
│                     developmental appropriateness                         │
│                                                                    530   │
└─────────────────────────────────────────────────────────────────────────┘
                                    │
                                    ▼
┌─────────────────────────────────────────────────────────────────────────┐
│ Update trained ML models based on feedback received for comprehensibility │
│               ranking signals generated by the ML models                  │
│                                                                    540   │
└─────────────────────────────────────────────────────────────────────────┘
```

```
Determine respective comprehensibility ranking signals for content items
corresponding to a user request, the comprehensibility ranking signals based
on learning attribute scores generated for the content items from at least one
machine learning model
                                                                      610
```

↓

```
Determine a learning level of a user corresponding to the user request
                                                                      620
```

↓

```
Rank the content items based on a mapping between the learning level and the
respective comprehensibility ranking signals of the content items
                                                                      630
```

↓

```
Provide a recommendation for the content items according to the ranking of the
content items
                                                                      640
```

↓

```
Identify a change in the learning level of the user to a new learning level
                                                                      650
```

↓

```
Update the recommendation for the content items based on a mapping
between the new learning level and the respective comprehensibility ranking
signals of the content items
                                                                      660
```

↓

```
Automatically update the recommendation for the content items according to
the updated ranking of the content items
                                                                      670
```

FIG. 6

COMPREHENSIBILITY-BASED IDENTIFICATION OF EDUCATIONAL CONTENT OF MULTIPLE CONTENT TYPES

TECHNICAL FIELD

This disclosure relates to the field of content sharing platforms and, in particular, to comprehensibility-based identification of educational content of multiple content types.

BACKGROUND

On the Internet, content sharing platforms allow users to connect to and share information with each other. The content sharing aspect of such platforms allows users to upload, view, and share content, such as video content, image content, audio content, text content, website, applications, channels, playlists, and so on (which may be collectively referred to as "media items" or "content items"). Such viewable and shareable content items may include audio clips, movie clips, TV clips, and music videos, as well as amateur content such as video blogging, short original videos, pictures, photos, other multimedia content, etc. Users may use computing devices (such as smart phones, cellular phones, laptop computers, desktop computers, netbooks, tablet computers, network-connected televisions) to use, play, and/or consume media items (e.g., watch digital videos, and/or listen to digital music).

SUMMARY

The following is a simplified summary of the disclosure in order to provide a basic understanding of some aspects of the disclosure. This summary is not an extensive overview of the disclosure. It is intended to neither identify key or critical elements of the disclosure, nor delineate any scope of the particular implementations of the disclosure or any scope of the claims. Its sole purpose is to present some concepts of the disclosure in a simplified form as a prelude to the more detailed description that is presented later.

In an aspect of the disclosure, a method includes determining, by a processing device, respective comprehensibility ranking signals for content items corresponding to a user request, the comprehensibility ranking signals based on learning attribute scores generated for the content items from at least one machine learning model, determining a learning level of a user corresponding to the user request, ranking the content items based on a mapping between the learning level and the respective comprehensibility ranking signals of the content items, and providing, by the processing device, a recommendation for the content items according to the ranking of the content items.

In some implementations, the method further includes identifying a change in the learning level of the user to a new learning level, updating the recommendation for the content items based on a mapping between the new learning level and the respective comprehensibility ranking signals of the content items, and automatically updating the recommendation for the content items according to the updated ranking of the content items.

In one implementation, the user request of the method includes at least one of a search query or navigation to a portion of an application. Further, the application may be an application launcher on a home screen user interface of a client device. In addition, the user request may correspond to a subject associated with a learning experience.

In one implementation, the content items include at least one of an application, a video, a book, or a web page. Further, providing the recommendation of the method may include recommending higher-ranked content items over lower-ranked content items. Moreover, the method may further include modifying the ranking of the content items based on an interest level of the user in the content items.

In some implementations, the learning attribute scores correspond to learning attributes including two or more of appeal, depth, sparkability, learning impact, or developmental appropriateness. The at least one machine learning model may include a machine learning model for each learning attribute for each of a plurality of learning levels. Furthermore, the at least one machine learning model may be trained using manual ratings and predetermined learning levels for sample content items. In one implementation, the learning attribute scores are generated by the at least one machine learning model are combined to generate the comprehensibility ranking signal.

In one implementation, combining the learning attributes scores of the method includes applying weights to the learning attribute scores. Furthermore, the comprehensibility ranking signal may be used to place at least one of the content items in a learning tree. Moreover, the learning level of the user may be based on at least one of user artifacts, user metrics, or manual user input of the learning level. In some implementations, the method may further include at least one of automatically installing, automatically uninstalling, or automatically updating recommended content items provided via a user interface (UI) of a client device based on the updated recommendation for the content items.

Computing devices for performing the operations of the above described method and the various implementations described herein are disclosed. Computer-readable media that store instructions for performing operations associated with the above described method and the various implementations described herein are also disclosed.

BRIEF DESCRIPTION OF THE DRAWINGS

The disclosure is illustrated by way of example, and not by way of limitation, in the figures of the accompanying drawings.

FIG. 2 is a flow diagram illustrating a method for comprehensibility-based identification of educational content of multiple content types, according to an implementation.

FIGS. 4A and 4B are flow diagrams illustrating methods for generating a comprehensibility ranking signal and utilizing the comprehensibility ranking signal for comprehensibility-based identification of educational content of multiple content types, according to an implementation.

FIG. 5 is a flow diagram illustrating a method for training a machine learning model for comprehensibility-based identification of educational content of multiple content types, according to an implementation.

FIG. 6 is a flow diagram illustrating a method for progressive content recommendation updates for comprehensibility-based identification of educational content of multiple content types, according to an implementation.

DETAILED DESCRIPTION

Figure 1:
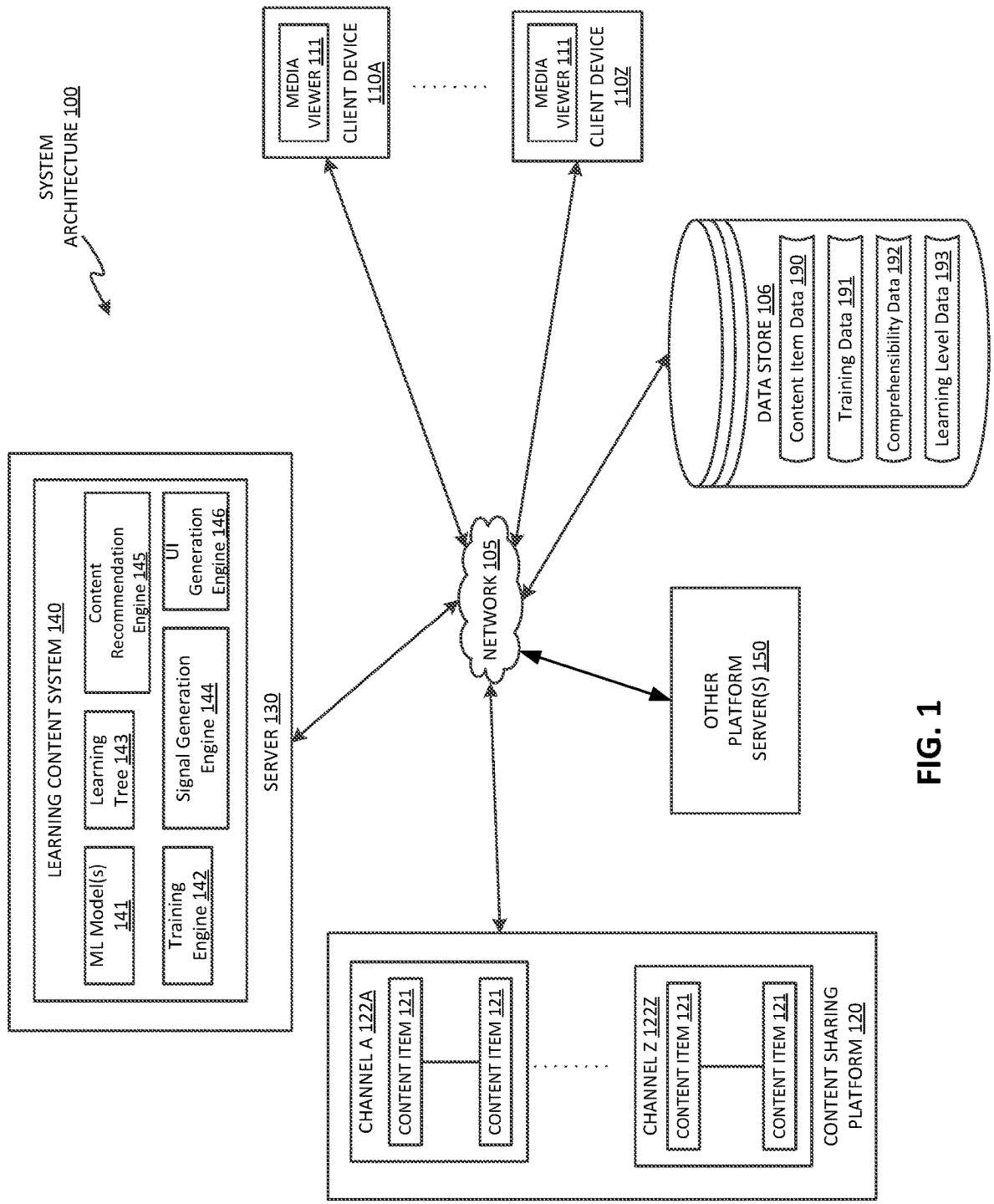
FIG. 1 is a block diagram illustrating an exemplary network architecture in which implementations of the disclosure may be implemented.

Aspects and implementations of the disclosure are directed to comprehensibility-based identification of educational content of multiple content types. Implementations are described for a learning content system that enables the identification, curation, and presentation of educational content appropriate and relevant for a comprehension level of a requesting user. Educational content may refer to one or more content items that are instructive, informational, academic, and/or safe (e.g., not mature, violent or explicit).

Implementations of the disclosure may identify content that is educational and at a corresponding comprehension level for a user that is interacting with the content. For example, the learning content system may identify topics (e.g., subjects, person, place, thing, etc.) that are educational to a user, identify content items (e.g., applications, videos, books, websites, etc.) for different user comprehension level groups for these topics, rank the identified content items according to comprehensibility and other metrics (e.g., interest level, etc.), and publish the content to a learning content interface of the content sharing platform. In one implementation, the learning content interface may include a home screen user interface (UI) of a learning-specific application associated with the content sharing platform.

Existing content curation solutions for learning and/or educational environments generally do not automate the process of identifying, curating, and presenting educational content that is appropriate and relevant for different learning levels (comprehension levels) of users. Existing content curation solutions for learning and/or educational environments typically provide a whitelist approach where a small set of content is human-selected out of an entire corpus of content. However, in current platforms for content curation, there may be more uploaded content to parse through than is practical for humans to review (e.g., 300 hours of video uploaded to many platforms every minute; numerous applications and books and websites available and introduced on a daily basis, etc.). Unlike aspects of the disclosure, these existing solutions usually are not being performed algorithmically, do not use high volumes of content, and/or do not have a high rate of incoming, new content as well as a large volume of base content.

A technical problem addressed by embodiments of the disclosure is that unnecessary processing resources and network bandwidth resources may be consumed by excessive communications between a client device and a server when trying to determine the ideal set of content items to curate for a user in terms of educational value and comprehensibility to the user. For example, typing in a search query for relevant educational content that corresponds to a comprehension level of a particular user can often take multiple attempts in order to drill down to the most relevant content for the user. The multiple requests can undesirably consume processing resources on both a client device and a server device. This is particularly problematic for the client device where battery life is limited and processing the multiple requests over a network drains the batteries and consumes network bandwidth of the device.

Further, each time irrelevant and undesired content items are presented to a user as a result of a search query or a user navigation within an application, the user may continue to request updated content via new search requests or additional navigation within the application. These additional requests are transmitted from the client device to a server to look-up content items based on the updated request. The server may transmit new results that include the different content items as suggestions to the client device that is displaying the search or navigation user interface. The data payload for transferring the updated suggestions may include a thumbnail, the full video file of the media content item, and metadata (e.g., title and description of the media content item). Sending multiple data payloads as the user enters the search query or continues to navigate can consume processing resources at the server to perform the look-ups, processing resources at the client device by displaying the list of suggested content items, network bandwidth resources by sending multiple data payloads as the updated requests are entered, and the like. This results in a slow process in the user arriving at a desired content item suggestion.

Ranked search results have also been utilized in existing search engines. However, this known solution suffers from inaccuracies in determining educational content that matches and/or is consistent with a learning level (comprehension level) of a requesting user. Moreover, these known solutions do not progressively update suggested content for the user as the comprehension level of the user changes.

A technical solution to the above identified technical problems may include identifying content that is educational and at an appropriate learning level (comprehension level) for a user that is interacting with the content. For example, a learning content system may utilize machine learning to identify content (e.g., applications, videos, books, websites, etc.) that is educational, algorithmically select such content for different user learning level (comprehension level) groups, rank the selected content according to a learning level of a user and other metrics (e.g., interest level, etc.), and publish the content to a learning content interface of a content sharing platform. In one implementation, the learning content interface may include a home screen UI of a learning specific application associated with the content sharing platform. Alternatively, the learning content platform may provide a service that identifies educational content at an appropriate learning level of users for various third party platforms (e.g., various social networking platforms, search engine platforms, media service platforms, online news platforms, content sharing platforms, etc.).

Furthermore, the learning content system can continuously and/or periodically re-assess the learning level of a user in order to respond to a change in the user's learning level by dynamically and progressively update the content curation provided to the user. If a learning level of a user improves to a next level (or regresses to a lower level), the learning content system can reassess a mapping of comprehensibility ranking signals for the content items being accessed by the user to the updated learning level of the user. As a result, the learning content system can dynamically surface new and/or different content for the user and provide such content to the user without user intervention to request such updated content. This may be performed without any user intervention, thus providing a seamless, progressive, and relevant experience in terms of content curation (with the learning application or with other services). In addition, processing resources and network bandwidth are reduced as less communication occurs between the client device and a server in order to surface the most relevant, educational, and comprehensible content for the user.

In one implementation, content items can be automatically installed, uninstalled and/or updated on a computing device based upon the content recommendation. For example, as the learning level of a user improves to a next level, new content that is appropriate to the new level of the user can be automatically installed on the user's computing device, without user intervention. Similarly, old content that is no longer appropriate to the new level of the user can be automatically uninstalled from the user's computing device, without user intervention. As another example, content that is no longer appropriate to the new level of the user can be automatically updated (e.g., by replacing the content with a different version, or by installing a plug-in), such that the updated content is appropriate to the new level of the user. This can overcome or mitigate problems associated with manual installation, uninstallation and updating of content on a computing device, such as a user having appropriate security permissions on the device and/or sufficient technical knowledge of how to install or uninstall content. Furthermore, the finite data storage capacity of the computing device can be better used by automatically uninstalling content that is no longer appropriate to the learning level of the user.

Thus, the technical effect may include reducing the number of communications needed to surface educational content that corresponds to a learning (comprehension) level of a user. Reducing the number of communications may also reduce the processing resources (on all of a remote control, client device and backend server) and network bandwidth resources that are incurred during a search because of improved content item identification and user comprehension (learning level) matching occurring on the backend server based on machine learning models.

In contrast to known solutions whereby content items are ranked based on affinity scores and user history, in embodiments of the disclosure machine learning is utilized to identify educational content that matches and/or is consistent with a learning level (comprehension level) of a requesting user and, moreover, that is progressively-updated without user intervention to match the user's changing learning (comprehension) level.

The disclosure often references videos for simplicity and brevity. However, the teaching of the disclosure are applied to media items generally and can be applied to various types of content or media items, including for example, video, audio, text, images, program instructions, etc.

FIG. 1 illustrates an example system architecture 100, in accordance with one implementation of the disclosure. The system architecture 100 includes client devices 110A through 110Z, a network 105, a data store 106, a content sharing platform 120, a server 130, and other platform server(s) 150. In one implementation, network 105 may include a public network (e.g., the Internet), a private network (e.g., a local area network (LAN) or wide area network (WAN)), a wired network (e.g., Ethernet network), a wireless network (e.g., an 802.11 network or a Wi-Fi network), a cellular network (e.g., a Long Term Evolution (LTE) network), routers, hubs, switches, server computers, and/or a combination thereof. In one implementation, the data store 106 may be a memory (e.g., random access memory), a cache, a drive (e.g., a hard drive), a flash drive, a database system, or another type of component or device capable of storing data. The data store 106 may also include multiple storage components (e.g., multiple drives or multiple databases) that may also span multiple computing devices (e.g., multiple server computers).

The client devices 110A through 110Z may each include computing devices such as personal computers (PCs), laptops, mobile phones, smart phones, tablet computers, netbook computers, network-connected televisions, etc. In some implementations, client device 110A through 110Z may also be referred to as "user devices." Each client device includes a media viewer 111. In one implementation, the media viewers 111 may be applications that allow users to view content, such as images, videos, web pages, documents, etc. For example, the media viewer 111 may be a web browser that can access, retrieve, present, and/or navigate content (e.g., web pages such as Hyper Text Markup Language (HTML) pages, digital media items, etc.) served by a web server. The media viewer 111 may render, display, and/or present the content (e.g., a web page, a media viewer) to a user. The media viewer 111 may also display an embedded media player (e.g., a Flash® player or an HTML5 player) that is embedded in a web page (e.g., a web page that may provide information about a product sold by an online merchant).

In another example, the media viewer 111 may be a standalone application that allows users to view digital media items (e.g., digital videos, digital images, electronic books, etc.). The media viewer 111 may be an application launcher (also referred to as a launcher application, launcher app, or launcher). An application launcher may refer to a computer program that helps a user to locate and start other computer programs. An application launcher may provide the backbone of an application experience on a mobile device, perform basic functions such as opening by default on boot, be assigned by default to the home button on a mobile device, provide a place to store applications ("apps") once installed, and so on. According to aspects of the disclosure, the media viewer 111 may an education-specific or learning-specific application that allows users to view and search for content appropriate for a learning (comprehension) level of the accessing user.

The media viewers 111 may be provided to the client devices 110A through 110Z by the server 130 and/or content sharing platform 120. For example, the media viewers 111 may be embedded media players that are embedded in web pages provided by the content sharing platform in 120. In another example, the media viewers 111 may be applications that are downloaded from the server 130.

In general, functions described in one implementation as being performed by the content sharing platform 120 or by servers 130, 150 can also be performed on the client devices 110A through 110Z in other implementations, if appropriate. In addition, the functionality attributed to a particular component can be performed by different or multiple components operating together. The content sharing platform 120 can also be accessed as a service provided to other systems or devices through appropriate application programming interfaces, and thus is not limited to use in websites.

In one implementation, the content sharing platform 120 and/or servers 130, 150 may be one or more computing devices (such as a rackmount server, a router computer, a server computer, a personal computer, a mainframe computer, a laptop computer, a tablet computer, a desktop computer, etc.), data stores (e.g., hard disks, memories, databases), networks, software components, and/or hardware components that may be used to provide a user with access to media items and/or provide the media items to the user. For example, the content sharing platform 120 may allow a user to consume, upload, search for, approve of ("like"), dislike, and/or comment on media items. The content sharing platform 120 may also include a website (e.g., a webpage) or application back-end software that may be used to provide a user with access to the media items.

In implementations of the disclosure, a "user" may be represented as a single individual. However, other implementations of the disclosure encompass a "user" being an entity controlled by a set of users and/or an automated source. For example, a set of individual users federated as a community in a social network may be considered a "user". In another example, an automated consumer may be an automated ingestion pipeline, such as a topic channel, of the content sharing platform 120.

The content sharing platform 120 may include multiple channels (e.g., channels A 122A through Z 122Z). A channel 122A-122Z can be data content available from a common source or data content having a common topic, theme, or substance. The data content can be digital content chosen by a user, digital content made available by a user, digital content uploaded by a user, digital content chosen by a content provider, digital content chosen by a broadcaster, etc. For example, a channel X can include videos Y and Z. A channel 122A-122Z can be associated with an owner, who is a user that can perform actions on the channel. Different activities can be associated with the channel 122A-122Z based on the owner's actions, such as the owner making digital content available on the channel, the owner selecting (e.g., liking) digital content associated with another channel, the owner commenting on digital content associated with another channel, etc. The activities associated with the channel 122A-122Z can be collected into an activity feed for the channel. Users, other than the owner of the channel 122A-122Z, can subscribe to one or more channels in which they are interested. The concept of "subscribing" may also be referred to as "liking", "following", "friending", and so on.

Once a user subscribes to a channel 122A-122Z, the user can be presented with information from the channel's activity feed. If a user subscribes to multiple channels, the activity feed for each channel to which the user is subscribed can be combined into a syndicated activity feed. Information from the syndicated activity feed can be presented to the user. Channels 122A-122Z may have their own feeds. For example, when navigating to a home page of a channel on the content sharing platform, feed items produced by that channel may be shown on the channel home page. Users may have a syndicated feed, which is a feed comprised of at least a subset of the content items from all of the channels to which the user is subscribed. Syndicated feeds may also include content items from channels that the user is not subscribed. For example, the content sharing platform 120 or other social networks may insert recommended content items into the user's syndicated feed, or may insert content items associated with a related connection of the user in the syndicated feed.

Each channel 122A-122Z may include one or more content items 121. Examples of a content item 121 can include, and are not limited to, digital video, digital movies, digital photos, digital music, website content, social media updates, electronic books (ebooks), electronic magazines, digital newspapers, digital audio books, electronic journals, web blogs, real simple syndication (RSS) feeds, electronic comic books, software applications, etc. In some implementations, content item 121 is also referred to as a media item.

A content item 121 may be consumed via the Internet and/or via a mobile device application. For brevity and simplicity, an online video (also hereinafter referred to as a video), an application ("app"), a book, and/or a website are used as examples of content items 121 throughout this document. As used herein, "content," "content item," "media," "media item," "online media item," "digital media," and "digital media item can include an electronic file that can be executed or loaded using software, firmware or hardware configured to present the digital media item to an entity. In one implementation, the content sharing platform 120 may store the content items 121 using the data store 106. In some implementations, servers 130, 150 and other external data sources may also store and provide content items 121.

In one implementation, the server 130 may be one or more computing devices (e.g., a rackmount server, a server computer, etc.). In one implementation, the server 130 may be included as part of the content sharing platform 120. In other implementations, server 130 is a separate service from the content sharing platform 120. The server 130 may include a learning content system 140. The learning content system 140 enables identification, curation, and presentation of educational content appropriate and relevant for a learning (comprehension) level of an accessing user. Educational content may refer to one or more content items that are instructive, informational, academic, and/or, in many cases, safe (e.g., not mature, violent or explicit).

Implementations of the disclosure may identify content that is educational and at an appropriate learning (comprehension) level for a user that is interacting with and/or accessing the content. For example, the learning content system 140 may identify topics (e.g., subjects, person, place, thing, etc.) that are educational to a user, algorithmically select and recommend content items (e.g., apps, videos, books, websites, etc.) for different user learning level (comprehension level) groups for these topics, rank the recommended content according to comprehensibility and other attributes (e.g., interest level, depth, etc.), and publish the content to a learning content interface of the learning content system 140 or content sharing platform 120. In one implementation, the learning content interface may include a home screen UI of a learning-specific application associated with the content sharing platform 120 and/or with server 130. Alternatively, the learning content system 140 may provide a service that identifies educational content at an appropriate learning level of users for various third party platforms (e.g., various social networking platforms, media service platforms, search engine platforms, online news platforms, content sharing platforms, etc.).

In some implementations, learning content system 140 of server 130 may interact with content sharing platform 120 and/or with other platform servers 150 to provide implementations of the disclosure. Although implementations of the disclosure are discussed in terms of content sharing platforms, implementations may also be generally applied to any type of social network providing connections between users, any type of media service platform providing content to users, any type of search engine platform, any type of online news platform, and the like. Implementations of the disclosure are not limited to content sharing platforms that provide channel subscriptions to users.

In situations in which the systems discussed here collect personal information about users, or may make use of personal information, the users may be provided with an opportunity to control whether the learning content system 140 and/or content sharing platform 120 collects user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by the learning content system 140 and/or content sharing platform 120.

Further to the description herein, a user may be provided with controls allowing the user to make an election as to both if and when systems, programs or features described herein may enable collection of user information (e.g., information about a user's social network, social actions or activities, profession, a user's preferences, a user's current location, or a user's learning level), and if the user is sent content or communications from a server. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over what information is collected about the user, how that information is used, and what information is provided to the user.

The learning content system 140 may interact with a single content platform (e.g., a social network, media service provider, search engine, online news provider, etc.) or may be utilized among multiple content platforms (e.g., provided as a service of a content sharing platform that is utilized by other third party content platforms). In one implementation, the learning content system 140 includes a machine learning (ML) model 141, a training engine 142, a learning tree 143, a signal generation engine 144, and a content recommendation engine 145, and a UI generation engine 146. More or less components may be included in the learning content system 140 without loss of generality. For example, two of the modules may be combined into a single module, or one of the modules may be divided into two or more modules. In one implementation, one or more of the modules may reside on different computing devices (e.g., different server computers, on a single client device, or distributed among multiple client devices, etc.). Furthermore, one or more of the modules may reside on different content sharing platforms, third party social networks, and/or external servers.

The learning content system 140 can be communicatively coupled to the data store 106. For example, the learning content system 140 may be coupled to the data store 106 via a network (e.g., via network 105 as illustrated in FIG. 1). In another example, the learning content system 140 may be coupled directly to a server where the learning content system 140 resides (e.g., may be directly coupled to server 130). The data store 106 may be a memory (e.g., random access memory), a cache, a drive (e.g., a hard drive), a flash drive, a database system, or another type of component or device capable of storing data. The data store 106 may also include multiple storage components (e.g., multiple drives or multiple databases) that may also span multiple computing devices (e.g., multiple server computers). The data store 106 includes content item data 190, training data 191, comprehensibility data 192, and learning level data 193.

As discussed above, the learning content system 140 enables the identification, curation, and presentation of educational content appropriate and relevant for a learning (comprehension) level of an accessing user in implementations of the disclosure. Educational content may refer to one or more content items that are instructive, informational, academic, and/or, in many cases, safe (e.g., not mature, violent or explicit).

Implementations of the disclosure generate an ML model that can determine and associated a score with a variety of learning attributes associated with a content item. Such "learning attributes" may include, but are not limited to, appeal, depth, sparkability, learning impact, and developmental appropriateness. More or less learning attributes than those described herein may be utilized by implementations of the disclosure. The discussion of the learning attributes provided herein is not meant to be exhaustive and other learning attributes may also be utilized in implementations of the disclosure and/or other terminology may be used to describe the above-mentioned learning attributes.

The learning attribute of appeal refers to how likely a user is to engage with a content item. The learning attribute of depth refers to how deep or thorough a content item is in terms of teaching a subject to the user. The learning attribute of sparkability refers to a measure of how much a content item spurs the user to learn more about content of the content item and/or engage with other content items similar to the content item. The learning attribute of learning impact refers to a measure of whether a content item is conveying new learning or value to the user. The learning attribute of developmental appropriateness refers to a measure of how difficult a content item may be for the user (e.g., too easy, just right, too difficult, etc.).

A combination of the above-described learning attributes can indicate a comprehension level associated with a content item. A comprehension level (also referred to herein as a "learning level") refers to a capability of understanding and interpreting something being presented to a user. For example, with respect to reading, comprehension refers to more than the act of correctly identifying a word being read. Instead, for the example of reading, comprehension refers to correctly understanding and interpreting the word being read. Furthermore, with respect to reading, comprehension involves (1) decoding what is read, (2) making connections between what is read and what is already known, and (3) thinking deeply about what is read.

As such, implementations of the disclosure utilize one or more machine learning (ML) models to generate learning attribute scores for each learning attribute for a content item. The generated learning attribute scores can be utilized to indicate a comprehension level that is associated with the content item. The comprehension level indicated by the learning attribute scores can be referred to herein as a comprehensibility ranking signal. The comprehensibility ranking signal(s) for the content item can be used to rank, recommend, and/or curate the content item to users having a comprehension level that corresponds to the comprehensibility ranking signal of the content item. In some implementations, the learning attribute scores may be utilized individually to rank, recommend, and/or curate the content item. In such a case, the learning attribute scores may each be considered comprehensibility ranking signals for the content item.

In some implementations, learning attributes for content items are scored for different learning levels. In one implementation, the learning levels may be similar to grade levels in an educational context (e.g., pre-kindergarten (pre-K), kindergarten (K), first grade, . . . , 12$^{th}$ grade, college level, graduate level, post-graduate level, and so on). As such, in some implementations, an ML model may be trained for each learning attribute at each learning level. For example, a first ML model may be trained for the appeal learning attribute at a first learning level (e.g., pre-K level), a second ML model may be trained for the appeal learning attribute at a second learning level (e.g., K level), and so on. As a result, a content item may have learning attribute scores (for each learning attribute) at each learning level generated by multiple ML models 141.

In accordance with the above, training engine 142 may be utilized to train one or more ML models 141 trained to generate a learning attribute score (and, thus, a comprehensibility ranking signal) for a content item. The training engine 142 may include a processing device or devices, such as a computer, microprocessor, logic device or other device or processor that is configured with hardware, firmware, and software to carry out some of the embodiments described herein. The training engine 142 may include or have access to a set of training data files and corresponding summaries for each of the training data files that are used as training data (e.g., stored as training data 191 in data store 106) by the training engine 142 to train the ML model 141 to perform learning attribute score generation.

An ML model 141 may refer to a model artifact that is created by the training engine 142 using training inputs and corresponding target outputs (e.g., as found in training data 191 of data store 106). The training inputs may include the set of training data files, and the corresponding target outputs may be learning attribute scores for respective training inputs. In some embodiments, the training data files and the corresponding target outputs may include a particular format (e.g., bullet point list). In one implementation, the training data may include sample content items that are identified with a topic and/or learning level. In one implementation, metadata of the content item includes the topic and/or learning level. (Such metadata may be stored, for example, as content item data 190 in data store 106.) The sample content is manually rated with a learning attribute score for each of the learning attributes at each learning level. These manual ratings are the target outputs. In one implementation, teachers or other education or subject matter experts can provide the manual ratings for each learning attribute at each learning level for the sample content.

The ML model 141 may use the training inputs and target outputs to learn features of words, phrases, or sentences in text that may predict and/or result in the target output. The features may include the appearance of a particular word in the text, frequency of words or phrases, co-occurrence of words or phrases, number of words in sentences, placement of words in the text, etc. As discussed above, multiple ML models 141 may be trained. For example, a first ML model 141 may be trained for the appeal learning attribute at the first learning level, a second ML model 141 may be trained for the appeal learning attribute at the second learning level, and so on for the appeal learning attribute at each learning level. Similarly, a third ML model 141 may be trained for the depth learning attribute at the first learning level, a fourth ML model 141 may be trained for the depth learning attribute at the second learning level, and so on for the depth learning attribute at each learning level. In this vain, ML models 141 may be trained for each learning attribute at each learning level. In other implementations, a single ML model 141 may be trained to generate the learning attribute scores for each of the learning levels.

In some implementations, an ML model 151 may be trained per combination of content type and learning attribute. For example, ML models may be trained for videos for each learning attribute at each learning level. Additional ML models may be trained for applications (apps) for each learning attribute at each learning level. Similarly, ML models may be trained for books, website, and other content types for each learning attribute at each learning level.

Once trained, the ML model(s) 141 may be applied to a new content item to obtain a learning attribute score for each learning attribute at each learning level for the new content item. As such, a new content item can have a variety of different learning attribute scores for the same learning attribute (e.g., appeal, depth, sparkability, learning impact, developmental appropriateness) based on the ML model 141 of the learning level that is being applied (e.g., the appeal score at the first learning level may be different than the appeal score for the second learning level, and so on). As discussed further below, the generated learning attribute scores from the ML models 141 can be used to indicate which learning level a content item is ideal for.

In one implementation, the learning attribute scores may be a numerical value. For example, the learning attribute scores may be a numerical value on a scale (e.g., from zero to one, one to five, zero or one to one hundred, etc.) indicating how central/relevant a content item is to the particular learning attribute, where a higher value can denote that the content item is more central/relevant to the learning attribute. In some implementations, content items with a learning attribute score falling below a threshold value may be filtered out of a result group.

In one implementation, the generated learning attribute scores for the content item may be stored for later use. For example, the learning attribute scores for a content item may be stored with the content item in content item data 190 or as comprehensibility data 192 of data store 106. In some implementations, the generated learning attribute scores are utilized in real-time for on-the-fly ranking, recommendation, and/or curation of the content item.

In one implementation, different types of content items may be processed in different ways for ingestion by the ML models 141. For example, books and text may be parsed to analyze the frequency and co-occurrence of words, placement of words, and so on. For a video, optical character recognition (OCR) and natural language processing (NLP) techniques may be applied to the video to extract audio and text and identify what is being discussed. Furthermore, metadata of the video may also be utilized as input to the ML model 141. For an application ("app"), relevant terms may be extracted from the app by emulating interactions with the app (e.g., navigating through the app) and taking screenshots of the resulting interactions. The captured screenshot images may then be analyzed via OCR over the text (and NPL over any audio) to extract content of the application for ingestion by the ML model 141. For web pages, a combination of the above techniques may be utilized to extract content for ingestion by the ML model 141.

In some implementations, the trained ML models 141 may be periodically updated based on feedback received on the generated learning attribute scores. This allows for continual improvement and development of the ML models 141 based on real-time feedback received on the learning attribute scores.

The signal generation engine 144 may cause the ML models 141 to be applied to new content items for purposes of ranking, recommending, and/or curating the content items for a user. In one implementation, the content items may be analyzed by signal generating engine 144 in response to a search query requested by the user. In some implementations, the content items may be analyzed by signal generating engine 144 in response to navigation by the user to a particular portion of an application. In some implementations, the content items may be analyzed by signal generating engine 144 in response to the user initializing an application (e.g., content curated on a landing page of an application).

The signal generation engine 144 may utilize the learning attribute scores generated by ML models 141 in a variety of ways. In one implementation, the signal generation engine 144 utilizes the learning attribute scores generated by ML models 141 to provide curated content items to a learning content interface of a learning-specific application associated with the content sharing platform 120 and/or with server 130. The learning-specification application may be provided to a user via media viewer 111 of client device 110A-110Z. More specifically, signal generation engine 144 may utilize the learning attribute scores for content items to curate content items that are educational and that are at an appropriate comprehension level for the user that is interacting with the content via the learning-specific application. An example user interface (UI) of a learning-specific application is discussed in more detail below with respect to FIG. 7.

In some implementations, signal generation engine 144 utilizes the learning attribute scores generated by ML models 141 to generate ranking signal(s) for content items for other uses by learning content system 140 (e.g., learning tree 143 discussed further below) and for use by other platform servers 150. For example, other platform servers 150 may provide services for recommending content items, such as, but not limited to, a search engine, a social network, a media service provider, an online news provider, and so on. The other platform servers 150 may utilize the comprehensibility ranking signal generated by signal generation engine 144 from the learning attribute scores in order to rank and/or recommend content provided by the other platform servers 150.

The signal generation engine 144 can utilize the learning attribute scores provided by ML models 141 in different ways to provide different content curation outcomes. For example, the signal generation engine 144 may combine the learning attribute scores into a single combined comprehensibility ranking signal that is used for ranking, recommendation, and/or curation of content items. The learning attribute scores may be combined based on a variety of functions, such as an average, a weighted average, a mean, a mode, or any known mathematical function for combining numerical values to generate one or more values.

The signal generation engine 144 may weight one or more of the attributes higher than the others when combining the scores based on a purpose of the curation. For example, in order to curate content items that may encourage a user to garner additional interest in a certain subject matter area, the signal generation engine 144 may weigh the appeal and/or sparkability learning attribute scores for a content item higher than the other learning attribute scores of depth, learning impact, and developmental appropriateness. Similarly, when seeking to challenge a user with more difficult content, the developmental appropriateness learning attribute score may be weighed higher than the other learning attribute scores, and so on. In some implementations, the signal generation engine 144 can take into account a subset of the learning attribute scores, while ignoring others of the learning attribute scores.

In some implementations, the signal generation engine 144 may structure the combination of the learning attribute scores in order to generate a comprehensibility ranking signal that identifies content items that a user at a particular learning level would understand but still be challenged by. As such, the generation of the comprehensibility ranking signal may weigh more strongly those learning attributes (e.g., developmental appropriateness, depth) and then select the content items with higher scores which indicate that a content item is slightly more difficult than average.

Once a comprehensibility ranking signal is generated by the signal generation engine 144, this signal may be passed on to the content recommendation engine 145 in order to identify content items for recommendation and/or curation. For purposes of recommendation and/or curating content for a user of an application, such as, but not limited to, the learning-specific application described herein, content recommendation engine 145 determines a learning level of a user accessing the curated content. As noted below, the determined learning level may also be for an associated user (e.g., family member) of the user. The learning level of the user may be stored and maintained in learning level data 193 of data store 106. In some implementations, the learning level of the user may correlate to an educational grade level that a user is in or that a user has most-recently completed. In one implementation, the learning level may be a numerical value used to indicate the learning level of the user. However, other representations of the learning level of a user are also envisioned.

In some implementations, the learning level of the user can be based on a user-provided age. Within a particular age, the learning level may be adapted based on how long as user has been at that age and/or at that particular learning level. In some implementations, the learning level of the user can be based on user artifacts including a history of user interactions with the learning-specific application and/or with the content sharing platform 120 and/or a third party content platform. In some implementations, the learning level of the user can be based on learning level metrics, such as a lexial level provided by the user or determined via interactions with the user. In further implementations, the learning level of the user can be based on a user-indicated input that indicates the learning level of the user. The learning level of the user may be based on any of the above factors and/or a combination of the above factors, as well as other learning level determinations. For example, the learning level of the user may be determined based on application of ML to artifacts generated by the user (e.g., user history within the learning-specific application).

In some implementations, a user may have more than one associated learning level. For example, a user may have a first learning level associated with a first subject matter area (e.g., math), while having a second (different) learning level associated with a second subject matter area (e.g., English language arts (ELA)), and so on. Furthermore, the learning level of the user may be adjusted as the user progresses (or regresses). As such, the content recommendation engine 145 may periodically assess or determine the learning level of the user in order to identify any changes in the user's learning level. In some implementations, a learning level of an associated user to the primary user may be utilized. For example, a learning level of a family member of the user may be determined and utilized in order to curate content specific to that family member.

The content recommendation generation engine 145 may map or otherwise correspond a determined learning level of a user to the comprehensibility ranking signal generated by signal generation engine 144 for content items being curated for the user. The content recommendation engine 145 may map the determined learning level of a user to content items being curated by the engine 145 by identifying which learning attribute scores for the content item most closely align with the determined learning level of the user. The content recommendation engine 145 may utilize a variety of different approaches for mapping learning attribute scores to learning level of a user. In one implementation, those content items having the highest learning attribute scores for the learning level that matches the user's learning level are ranked above other content items. For example, if a user is determined to be at a third learning level, then the content recommendation engine 145 may rank the content items having the highest learning attribute scores at the third learning level above other content items having lower learning attribute scores at the third learning level. As such, the content recommendation engine 145 can surface those content items deemed to be most educational and comprehensible to a user at a third learning level.

In one implementation, learning content system 140 can continuously and/or periodically re-assess the learning level of a user in order to update the content curation provided by the content recommendation engine 145 to the user. If a learning level of a user improves to a next level (or regresses to a lower level), the content recommendation engine 145 can reassess the mapping of the comprehensibility ranking signals for content items being accessed by the user to the updated learning level of the user. As a result, the content recommendation engine 145 may surface new and/or different content for the user and provide such content to the UI generation engine 146 for presentation to the user. This may be performed automatically without any user intervention, thus providing a seamless, progressive, and relevant experience in terms of content curation (with the learning application or with other services). As discussed herein, automatic may refer to performing a process without any manual input and/or user intervention from a client device or otherwise. In addition, processing resources and network bandwidth are reduced as less communication occurs between the client device 110A-110Z and the server 130 in order to surface the most relevant, educational, and comprehensible content for the user.

In one implementation, per the above discussion, content items can be automatically installed, uninstalled and/or updated on a computing device based upon the content recommendation. For example, as the learning level of a user improves to a next level, new content that is appropriate to the new level of the user can be automatically installed on the user's computing device, without user intervention. Similarly, old content that is no longer appropriate to the new learning level of the user can be automatically uninstalled from the user's computing device, without user intervention. As another example, content that is no longer appropriate to the new learning level of the user can be automatically updated (e.g., by replacing the content with a different version, or by installing a plug-in), such that the updated content is appropriate to the new level of the user. This can overcome or mitigate problems associated with manual installation, uninstallation and updating of content on a computing device, such as a user having appropriate security permissions on the client device and/or sufficient technical knowledge of how to install or uninstall content. Furthermore, the finite data storage capacity of the computing device can be better used by automatically uninstalling content that is no longer appropriate to the learning level of the user.

In one implementation, a particular use case of the comprehensibility ranking signal generated by signal generation engine 144 may be with a learning tree 143. The learning tree 143 is a data structure including information related to educational subject matter. The learning tree 143 is a structure into which a learning standard may be uniformly mapped into domains, sub-domains, topics, and skills. The learning tree 143 can be structured as a tree graph with a root node and corresponding children nodes connected to one another via edges. As such, the learning tree 143 may enable the mapping out of everything a person may learn in a standardized way (including educational subjects, as well as social and emotional skills).

Each node in the learning tree 143 can be drilled down into more detailed information regarding an educational topic, with the base nodes (i.e., bottom nodes) including identification of content relevant to the base node. In the learning tree 143, the base nodes may be organized according to learning level and may list the conditions for mastering the particular subject, topic, or skill at that learning level. For example, a base node corresponding to the topic of photosynthesis may be specific to a first learning level, while another base node also corresponding to the topic of photosynthesis may be specific to a second learning level, and so on. The learning tree 143 may be utilized similar to a knowledge graph in order to map various educational subject matter areas and developmental milestones into a structured setting and provide corresponding supporting content for the information imparted by the learning tree 143.

In one implementation, the comprehensibility ranking signal may be used by content recommendation engine 145 to place content in the learning tree 143. Content items may be placed in the base nodes of the learning tree 143 corresponding to a learning level. The comprehensibility ranking can thus be used to place a particular content item into a corresponding base node. For example, a content item with its highest learning attribute scores in learning level "X" may be correspondingly placed in a base node of the learning tree 143 associated with learning level "X".

Once content items to recommend and/or curate are identified by content recommendation engine 145, the identified content may then be provided to the UI generation module 146. The UI generation module 146 may associate formatting and other UI elements to generate a page or screen that displays the selected content as content that is educationally and comprehensively relevant to the accessing user. As discussed above, the content may be displayed via media viewer 111 on client device 110A-110Z. In some implementations, there is an optional manual (e.g., human) review of the selected content before it is displayed in the UI.

Figure 7:
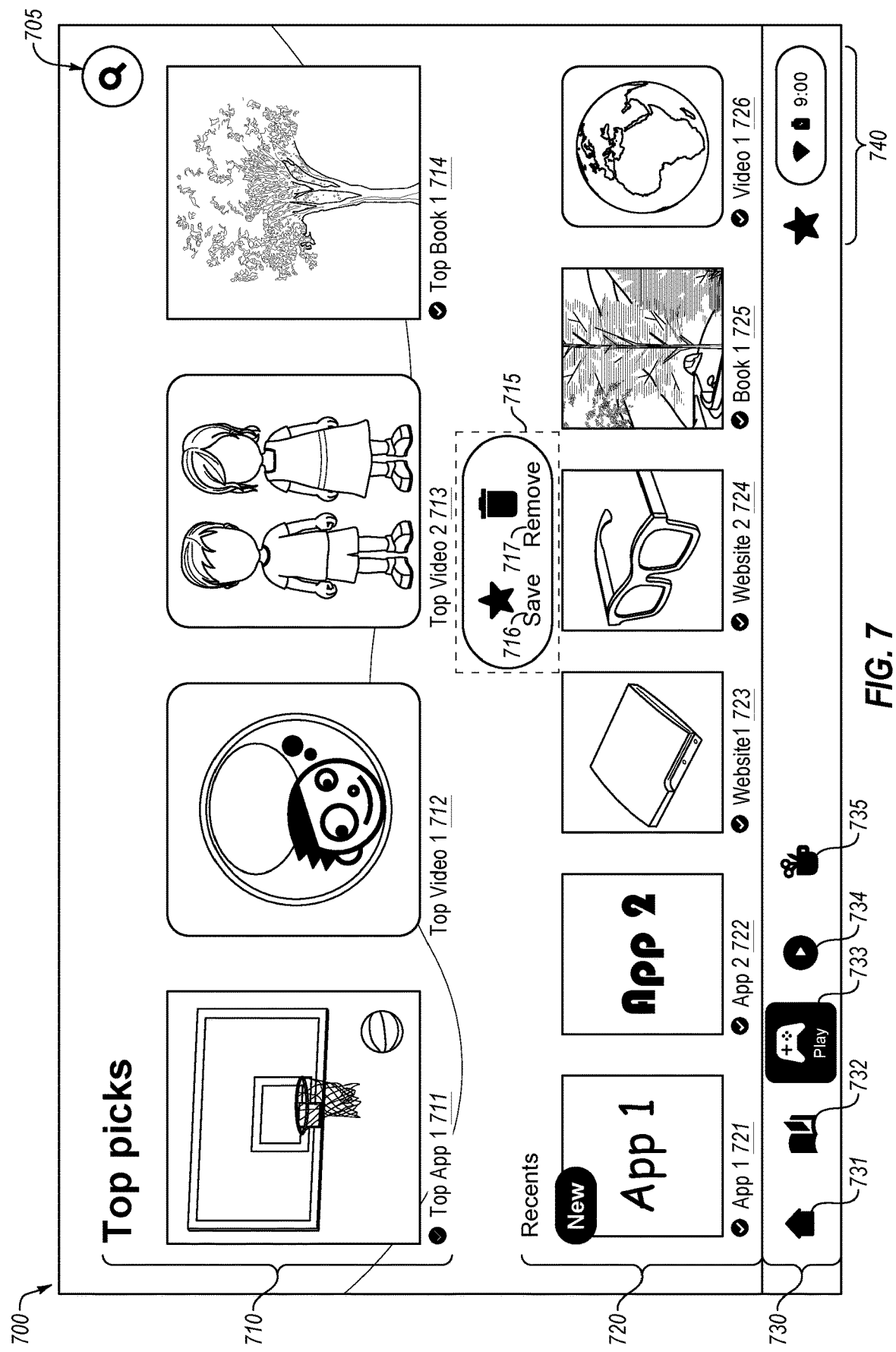
FIG. 7 illustrates an example screenshot of a learning application home screen user interface providing comprehensibility-based educational content suggestions, according to implementations of the disclosure

In further implementations, a learning interface may be generated and/or selected for display in the UI. FIG. 7 discussed further below provides an example learning application home screen UI 700 of a learning interface providing content that is curated as educational and comprehensible to an accessing user. As discussed above, the learning application may be an application launcher on a client device that allows for a streamlined application experience for a user by automating the management of the client device and the client device's programs. For example, the application launcher can provide for automatic downloads of applications without having to navigate to an application store, automatic launching of applications, automatic removal of applications, and/or ease of settings management (e.g., nested battery indicators, etc.) and account management (e.g., a parent zone) for family members.

The description herein discusses content curation in terms of identifying educational content items of the content sharing platform that are relevant and comprehensible for a learning level of a user. Different types of content may be identified including, but not limited to, individual content items (e.g., videos, apps, websites, books, etc.), playlists, and channels of a content sharing platform. In one implementation, the learning content system 140 230 curates content for display on a home screen of a teaming-specific application or web page of the learning specific application. The learning specific application may be provided by a content sharing platform, such as content sharing platform 120, or by another type of platform. In other implementations, learning content system module 140 may curate educational and comprehensible content for other purposes, such as for search results, recommendations, watch next/ related content, and so on.

FIG. 2 is a flow diagram illustrating a method 200 for comprehensibility-based identification of educational content of multiple content types, according to an implementation of the disclosure. The method 200 may be performed by processing logic that comprises hardware (e.g., circuitry, dedicated logic, programmable logic, microcode, etc.), software (e.g., instructions run on a processing device to perform hardware simulation), or a combination thereof. In one implementation, method 200 may be performed by learning content system 140 as shown in FIG. 1.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media.

Method 200 begins at block 210 where a processing device may determine respective comprehensibility ranking signals for content items corresponding to a user request. The user request may be a search query, a request to navigate content in an application, or any other user interaction with a content provider platform (e.g., various social networking platforms, search engine platforms, media service platforms, online news platforms, content sharing platforms, etc.). In one implementation, the comprehensibility ranking signals are based on learning attribute scores generated for the content items from at least one ML model. The learning attribute scores may correspond to the learning attributes of appeal, depth, sparkability, learning impact, and developmental appropriateness. In one implementation, an ML model may be utilized to generate a learning attribute score for each learning attribute at each learning level.

At block 220, the processing device may determine a learning level of a user corresponding to the user request. In one implementation, the learning level of the user can be based on one or more of a user-provided age, user artifacts, learning level metrics, a user configuration indicating the learning level of the user, and/or a combination of the above factors, as well as other learning level determinations. For example, the learning level of the user may be determined based on application of ML to artifacts generated by the user (e.g., user history within the learning-specific application) and/or other characteristics of the user (e.g., user age, grade level, etc.).

At block 230, the processing device may rank the content items based on a mapping between the learning level and the respective comprehensibility ranking signals of the content items. In one implementation, the mapping may identify the learning attribute scores for the content items that most closely align with the determined learning level of the user. In some implementations, a variety of other different approaches can be used for mapping learning attribute scores to learning level of a user. For example, those content items having the highest learning attribute scores for the learning level that best correlates to the user's learning level are ranked above other content items. As a result, those content items deemed to be most educational and comprehensible to a user at a particular learning level can be surfaced for the user.

Lastly, at block 240, the processing device may provide a recommendation for the content items according to the ranking of the content items. In one implementation, a page or screen may be generated that provides the recommended content items as content that is educationally and comprehensibly-relevant to the user. For example, the page or screen may be an interface of a learning-specific application that the user is accessing.

Figure 3:
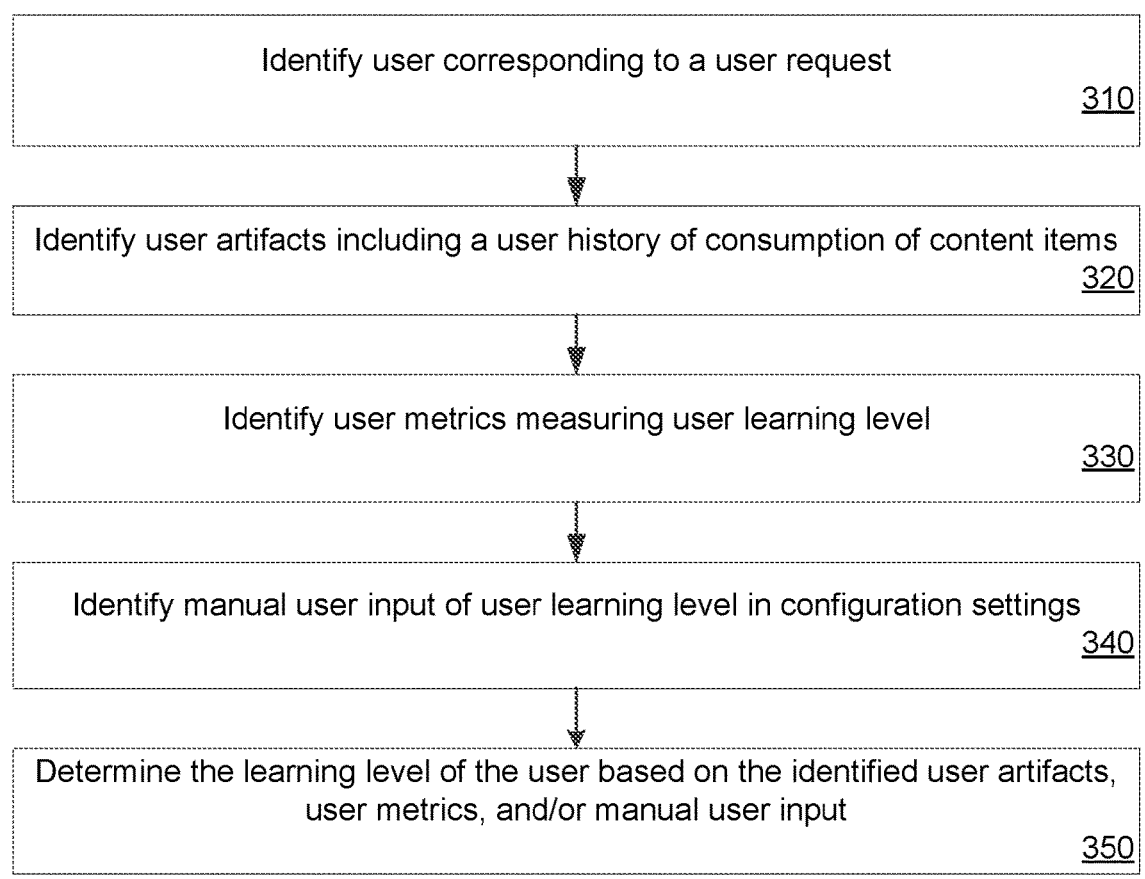
FIG. 3 is a flow diagram illustrating a method for identifying a learning level of a user for comprehensibility-based identification of educational content of multiple content types, according to an implementation.

FIG. 3 is a flow diagram illustrating a method 300 for identifying a learning level of a user for comprehensibility-based identification of educational content of multiple content types, according to an implementation of the disclosure. The method 300 may be performed by processing logic that comprises hardware (e.g., circuitry, dedicated logic, programmable logic, microcode, etc.), software (e.g., instructions run on a processing device to perform hardware simulation), or a combination thereof. In one implementation, method 300 may be performed by learning content system 140 as shown in FIG. 1.

Method 300 begins at block 310 where a processing device may identify a user corresponding to a user request. Then, at block 320, the processing device may identify user artifacts. In one implementation, the user artifacts include a user history of consumption of content items. At block 330, the processing device may identify user metrics measuring the user learning level. At block 340, the processing device may identify any manual user input of the user learning level in configuration settings. Lastly, at block 350, the processing device may determine the learning level of the user based on the identified user artifacts, user metrics, and manual user input.

FIGS. 4A and 4B are flow diagrams illustrating methods 400, 450 for generating a comprehensibility ranking signal and utilizing the comprehensibility ranking signal for comprehensibility-based identification of educational content of multiple content types, according to some implementations of the disclosure. The methods 400, 450 may be performed by processing logic that comprises hardware (e.g., circuitry, dedicated logic, programmable logic, microcode, etc.), software (e.g., instructions run on a processing device to perform hardware simulation), or a combination thereof in one implementation, methods 400 and 450 may be performed by learning content system 140 as shown in FIG. 1.

Referring to FIG. 4A, method 400 determines a comprehensibility ranking signal according to one implementation of the disclosure. Method 400 begins at block 410 where a processing device may receive a request for a comprehensibility ranking signal for a content item. At block 420, method 400 performs blocks 422 and 424 for each learning level configured in the underlying system. At each learning level, the processing device, at block 422, may apply one or more ML models for each of a plurality of learning attributes to the content item. The one or more ML models generate a learning attribute score for each learning attributes that the respective learning level. Then, at block 424, the processing device combines the generated learning attribute scores from the ML models into a final comprehensibility ranking signal for the content item at the respective learning level. As discussed above, in some implementations, the learning attributes scores may be weighted according to a desired outcomes for the type of content to be recommended (e.g., recommending more "appealing" content or recommending more "difficult" content in terms of comprehension, etc.). In some implementations, the learning attribute scores may not be combined and may instead be utilized individually for purposes of ranking, recommendation, and/or curation.

Once the comprehensibility ranking signals for the content item have been generated for each learning level via blocks 420-424, method 400 proceeds to block 430 where the processing device may return the generated individual learning attribute scores and the final comprehensibility ranking signal for the content item at each learning level. Lastly, at block 440, the processing device may store the generated individual learning attribute scores and the final comprehensibility ranking signal for the content item at each learning level.

Referring to FIG. 4B, method 450 utilizes a determined comprehensibility ranking signal for placing content items in a learning tree according to an implementation of the disclosure. Method 450 begins at block 460 where a processing device may receive a request for a comprehensibility ranking signal for a content item being placed in a learning tree. In one implementation, the learning tree refers to a data structure including information related to educational subject matter. At block 470, the processing device may apply one or more ML models to the content item to generate the comprehensibility ranking signal for the content item at each learning level. One implementation, method 400 of FIG. 4A may be used to generated the comprehensibility ranking signal for the content item.

At block 480, the processing device may determine a highest generated comprehensibility ranking signal for the content item among the learning levels. Lastly, at block 490, the processing device may place the content item in the learning tree at a learning level corresponding to the determined learning level of block 480.

FIG. 5 is a flow diagram illustrating a method 500 for training an ML model for comprehensibility-based identification of educational content of multiple content types, according to an implementation of the disclosure. The method 500 may be performed by processing logic that comprises hardware (e.g., circuitry, dedicated logic, programmable logic, microcode, etc.), software (e.g., instructions run on a processing device to perform hardware simulation), or a combination thereof. In one implementation, method 500 may be performed by learning content system 140 as shown in FIG. 1.

Method 500 begins at block 510 where a processing device may obtain sample content items having metadata indicating an identified learning level of the content item and an educational topical fit for the content item (e.g., subject matter area of the content item). Subsequently, at block 520, the processing device may, for each learning level configured for the underlying system, obtain manual ratings for the sample content items with respect to different learning attributes. In one implementation, the different learning attributes include, but are not limited to, appeal, depth, sparkability, learning impact, and developmental appropriateness.

At block 530, the processing device may train one or more ML models using training data. In one implementation, the training data includes features of the metadata determined at block 510 and labels of the manual rating obtained at block 520. The one or more ML models are trained for each of the learning attributes including appeal, depth, sparkability, learning impact, and developmental appropriateness. Lastly, at block 540, the processing device may update the trained ML models based on feedback received on comprehensibility ranking signals generated by the ML models.

FIG. 6 is a flow diagram illustrating a method 600 for progressive content recommendation updates for comprehensibility-based identification of educational content of multiple content types, according to an implementation of the disclosure. The method 600 may be performed by processing logic that comprises hardware (e.g., circuitry, dedicated logic, programmable logic, microcode, etc.), software (e.g., instructions run on a processing device to perform hardware simulation), or a combination thereof. In one implementation, method 600 may be performed by learning content system 140 as shown in FIG. 1.

Referring to FIG. 6, method 600 beings at block 610 where a processing device may determine respective comprehensibility ranking signals for content items corresponding to a user request. In one implementation, the comprehensibility ranking signals are based on learning attribute scores generated for the content items from at least one ML model. The learning attribute scores may correspond to the learning attributes of appeal, depth, sparkability, learning impact, and developmental appropriateness. In one implementation, and ML model may be utilized to generate a learning attribute score for each learning attribute at each learning level.

At block 620, the processing device may determine a learning level of a user corresponding to the user request. Subsequently, at block 630, the processing device may rank the content items based on a mapping between the learning level and the respective comprehensibility ranking signals of the content items. In one implementation, the mapping may identify the learning attribute scores for the content items that most closely align with the determined learning level of the user. At block 640, the processing device may provide a recommendation for the content items according to the ranking of the content items. In one implementation, a page or screen may be generated that provides the recommended content items as content that is educationally and comprehensively-relevant to the user. For example, the page or screen may be an interface of a learning-specific application that the user is accessing.

Subsequently, at block 650, the processing device may identify a change in the learning level of the user to a new learning level. In one implementation, the learning level of the user may be periodically and/or continuously assessed to determine whether the learning level has changed. At block 660, the processing device may update the recommendation for the content items based on a mapping between the new learning level and the respective comprehensibility ranking signals of the content items. Lastly, at block 670, the processing device may automatically update the recommendation for the content items according to the updated ranking of the content items from block 660. In one implementation, automatic update of the recommendation includes updating the recommendation without any user intervention or manual input from the user via the client device.

FIG. 7 illustrates an example screenshot of a learning application home screen UI 700 providing comprehensibility-based identification of educational content of multiple content types, according to implementations of the disclosure. FIG. 7 illustrates an example screenshot of a learning application home screen UI 700 provided to a user viewing a home screen page of a learning application of a content sharing platform.

Learning application home screen UI 700 may include a navigation bar 730 running on the bottom of the UI 700 including a home icon 730, a books icon 732, a play icon 733, a videos icon 740, and an activities icon 735. The navigation bar 730 may also include status icons 740 including favorites (e.g., star icon) and device status indicators (network connectivity, battery status, time, etc.). A search icon 705 is also displayed in UI 700.

Learning application home screen UI 700 may also provide content recommendations in different sections of the UI 700. For example, a "Top Picks" section 710 may display content icons 711-714. A "Recents" section 720 of the UI 700 may display content icons 721-726. The content icons 711-714, 721-716 may correspond to content items such as, but not limited to, videos, apps, books, websites, channels, or playlists, and so on. Content icon 711 is a top app 1, content icon 712 is a top video 1, content icon 713 is a top video 2, and content icon 714 is a top book 1. Content icon 721 is an app 1, content icon 722 is an app 2, content icon 73 is a website 1, content item 724 is a website 2, content icon 725 is a book 1, and content icon 726 is a video 1.

If a user selects one or more of the content icons 711-714, 721-726, the content corresponding to the content icon may be caused to be downloaded to the underling client device displaying the UI 700. In some implementations, selection of one or more of the content icons 711-714, 721-726 may cause the particular content corresponding to the content icon 711-714, 721-716 to be opened and displayed on the UI 700. In some implementations, if a content icon 711-714, 721-726 is interacted with in a predetermined manner (e.g., left click, two finger selection, etc.), a quick options window 715 may be displayed including options to save 716 and/or remove 715 the content icon 711-714, 721-726.

The content icons 711-714, 721-716 displayed for a particular section 710, 720 may be the educational and comprehensible content curated for a user by a learning content system per the processes described above with respect to FIGS. 1 through 6. For example, as illustrated in FIG. 7, content icons 711-714, 721-726 correspond to videos, apps, websites, books, channels, playlists, and so on, curated for a user as educational and comprehensibly-relevant to a user that is accessing the UI 700. Content icons 711-714 may be content items selected and ranked as best matching the learning level of the user accessing the UI 700. Content icons 721-726 may be those content items most recently accessed by the user in the learning application.

As illustrated in UI 700, the display of the content icon 711-714, 721-726 may vary based on the type of content corresponding to the icon. For example, video content icons 712, 713, 726 are displayed with rounded corner edges, while the other content icons of the different content types (e.g., app, book, website, etc.) are displayed with square corner edges. Different display options for different content types than those illustrated herein are possible and envisioned.

Figure 8:
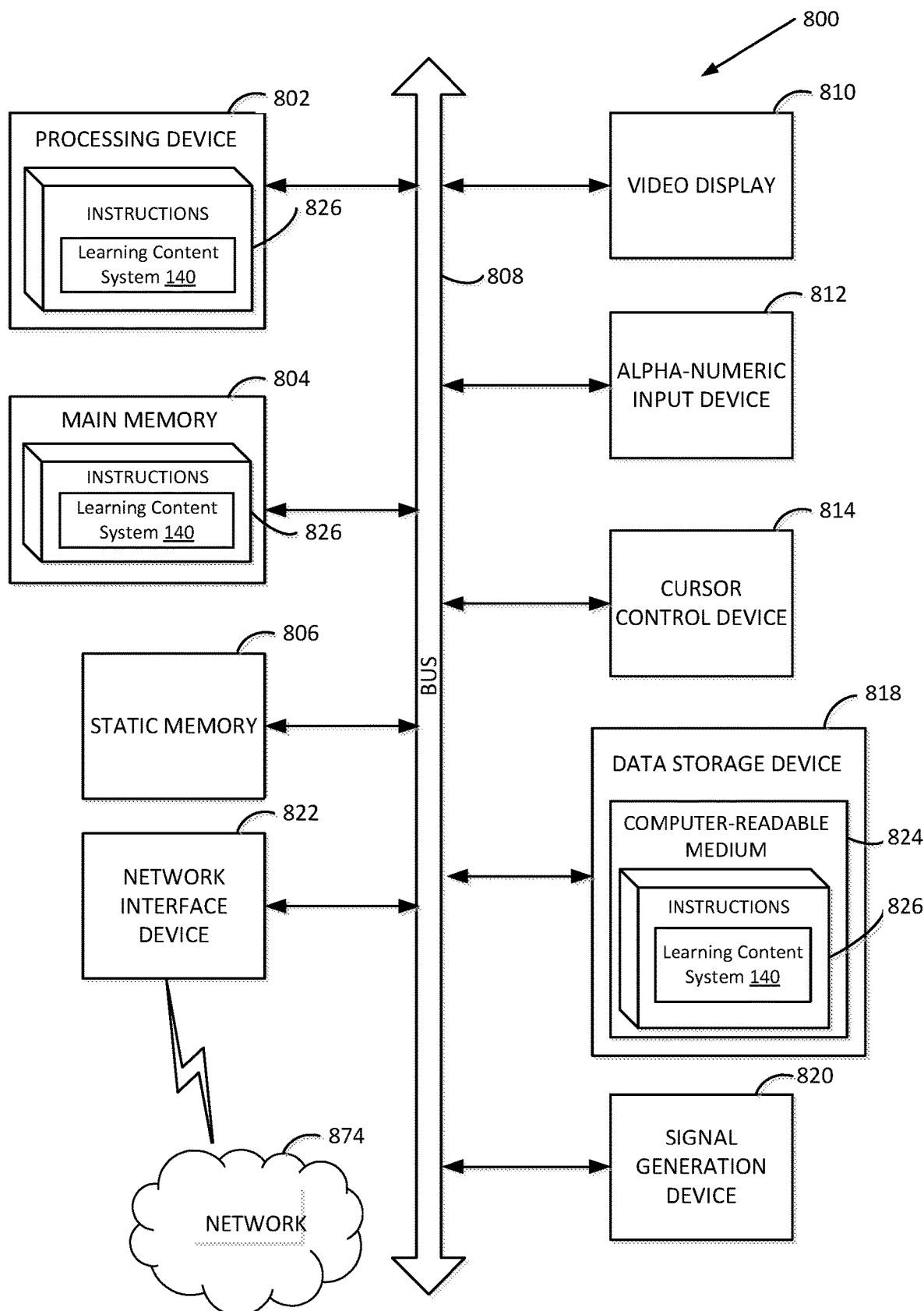
FIG. 8 is a block diagram illustrating one implementation of a computer system, according to an implementation.

FIG. 8 illustrates a diagrammatic representation of a machine in the exemplary form of a computer system 800 within which a set of instructions, for causing the machine to perform any one or more of the methodologies discussed herein, may be executed. In alternative implementations, the machine may be connected (e.g., networked) to other machines in a local area network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. In one implementation, computer system 800 may be representative of a server, such as server 102, executing a learning content system 140, as described with respect to FIG. 1.

The exemplary computer system 800 includes a processing device 802, a main memory 804 (e.g., read-only memory (ROM), flash memory, dynamic random access memory (DRAM) (such as synchronous DRAM (SDRAM) or Rambus DRAM (RDRAM), etc.), a static memory 806 (e.g., flash memory, static random access memory (SRAM), etc.), and a data storage device 818, which communicate with each other via a bus 808. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Processing device 802 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 902 may also be one or more special-purpose processing devices such as an application specific integrated circuit (ASIC), a field programmable gate array (FPGA), a digital signal processor (DSP), network processor, or the like. The processing device 802 is configured to execute processing logic 826 for performing the operations and steps discussed herein.

The computer system 800 may further include a network interface device 822. The computer system 800 also may include a video display unit 810 (e.g., a liquid crystal display (LCD) or a cathode ray tube (CRT)), an alphanumeric input device 812 (e.g., a keyboard), a cursor control device 814 (e.g., a mouse), and a signal generation device 820 (e.g., a speaker).

The data storage device 818 may include a computer-readable storage medium 824 (also referred to as a machine-readable storage medium), on which is stored one or more set of instructions 826 (e.g., software) embodying any one or more of the methodologies of functions described herein. The instructions 826 may also reside, completely or at least partially, within the main memory 804 and/or within the processing device 802 during execution thereof by the computer system 800; the main memory 804 and the processing device 802 also constituting machine-readable storage media. The instructions 826 may further be transmitted or received over a network 874 via the network interface device 822.

The computer-readable storage medium 824 may also be used to store instructions to perform a method for comprehensibility-based identification of educational content of multiple content types, as described herein. While the computer-readable storage medium 824 is shown in an exemplary implementation to be a single medium, the term "machine-readable storage medium" should be taken to include a single medium or multiple media (e.g., a centralized or distributed database, and/or associated caches and servers) that store the one or more sets of instructions. A machine-readable medium includes any mechanism for storing information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory; or another type of medium suitable for storing electronic instructions.

The preceding description sets forth numerous specific details such as examples of specific systems, components, methods, and so forth, in order to provide a good understanding of several implementations of the disclosure. It will be apparent to one skilled in the art, however, that at least some implementations of the disclosure may be practiced without these specific details. In other instances, well-known components or methods are not described in detail or are presented in simple block diagram format in order to avoid unnecessarily obscuring the disclosure. Thus, the specific details set forth are merely exemplary. Particular implementations may vary from these exemplary details and still be contemplated to be within the scope of the disclosure.

Reference throughout this specification to "one implementation" or "an implementation" means that a particular feature, structure, or characteristic described in connection with the implementation is included in at least one implementation. Thus, the appearances of the phrase "in one implementation" or "in an implementation" in various places throughout this specification are not necessarily all referring to the same implementation. In addition, the term "or" is intended to mean an inclusive "or" rather than an exclusive "or."

Although the operations of the methods herein are shown and described in a particular order, the order of the operations of each method may be altered so that certain operations may be performed in an inverse order or so that certain operation may be performed, at least in part, concurrently with other operations. In another implementation, instructions or sub-operations of distinct operations may be in an intermittent and/or alternating manner.

What is claimed is:

1. A method comprising:
    generating, using at least one machine learning model, learning attribute scores for learning attributes of each of a plurality of first educational content items corresponding to a request of a user for educational content, wherein the at least one machine learning model is trained using training inputs comprising a plurality of second educational content items and target outputs comprising learning attribute ratings of learning attributes of each of the plurality of second educational content items;
    combining, by a processing device, the learning attribute scores of each first educational content item to determine a comprehensibility ranking signal for a respective first educational content item, wherein the comprehensibility ranking signal is indicative of a comprehension level associated with the respective first educational content item;
    determining a learning level of a user corresponding to the user request, wherein the learning level of the user is determined in response to receiving the request of the user for the educational content;
    ranking the plurality of first educational content items based on a mapping between the learning level of the user and respective-comprehensibility ranking signals of the plurality of first educational content items;
    providing, by the processing device, a recommendation for presentation on a user interface (UI) of a user device of the user, the recommendation comprising a subset of the plurality of first educational content items identified according to the ranking of the plurality of first educational content items, wherein providing the recommendation comprises automatically installing the subset of the plurality of first educational content items provided via the UI of the user device;
    identifying a change in the learning level of the user to a new learning level, wherein the new learning level is determined in response to at least one of: receiving user input indicating the new learning level, or detecting a change in an interest level of the user in the plurality of first educational content items;
    determining a revised subset of the plurality of first educational content items based on a mapping between the new learning level of the user and the respective comprehensibility ranking signals of the plurality of first educational content items; and
    causing the UI of the user device of the user to be automatically updated with a revised recommendation comprising the revised subset of the plurality of first educational content items, wherein causing the UI of the user device of the user to be automatically updated comprises automatically uninstalling, or automatically updating the subset of first educational content items provided via the UI of the user device with the revised subset of the plurality of first educational content items.

2. The method of claim 1, wherein the user request comprises at least one of a search query pertaining to the educational content or navigation to a portion of an application associated with the educational content.

3. The method of claim 2, wherein the application comprises an application launcher on a home screen user interface of a client device.

4. The method of claim 1, wherein the user request corresponds to a subject pertaining to the educational content and associated with a learning experience.

5. The method of claim 1, wherein the plurality of first educational content items comprise at least one of an application, a video, a book, or a web page.

6. The method of claim 1, further comprising modifying the ranking of the plurality of first educational content items in response to identifying the change in the learning level of the user to the new learning level.

7. The method of claim 1, wherein the learning attribute scores correspond to learning attributes comprising two or more of appeal, depth, sparkability, learning impact, or developmental appropriateness.

8. The method of claim 7, wherein the at least one machine learning model comprises a machine learning model for each learning attribute for each of a plurality of learning levels.

9. The method of claim, 1 wherein combining the learning attributes scores comprises applying weights to the learning attribute scores.

10. The method of claim 1, wherein the comprehensibility ranking signal is used to place at least one of the plurality of first educational content items in a learning tree.

11. The method of claim 1, wherein the learning level of the user is based on at least one of user artifacts, user metrics, or manual user input of the learning level.

12. A system comprising:
a memory; and
a processing device coupled to the memory, wherein the processing device is to:
generate, using at least one machine learning model, learning attribute scores for learning attributes of each of a plurality of first educational content items corresponding to a request of a user for educational content, wherein the at least one machine learning model is trained using training inputs comprising a plurality of second educational content items and target outputs comprising learning attribute ratings of learning attributes of each of the plurality of second educational content items;
combine the learning attribute scores of each first educational content item to determine a comprehensibility ranking signal for a respective first educational content item, wherein the comprehensibility ranking signal is indicative of a comprehension level associated with the respective first educational content item;
determine a learning level of a user corresponding to the user request, wherein the learning level of the user is determined in response to receiving the request of the user for the educational content;
rank the plurality of first educational content items based on a mapping between the learning level of the user and respective-comprehensibility ranking signals of the plurality of first educational content items;
provide a recommendation for presentation on a user interface (UI) of a user device of the user, the recommendation comprising a subset of the plurality of first educational content items identified according to the ranking of the plurality of first educational content items, wherein providing the recommendation comprises automatically installing the subset of the plurality of first educational content items provided via the UI of the user device;
identify a change in the learning level of the user to a new learning level, wherein the new learning level is determined in response to at least one of: receiving user input indicating the new learning level, or detecting a change in an interest level of the user in the plurality of first educational content items;
determine a revised subset of the plurality of first educational content items based on a mapping between the new learning level of the user and the respective comprehensibility ranking signals of the plurality of first educational content items; and
cause the UI of the user device of the user to be automatically updated with a revised recommendation comprising the revised subset of the plurality of first educational content items, wherein causing the UI of the user device of the user to be automatically updated comprises automatically uninstalling, or automatically updating the subset of first educational content items provided via the UI of the user device with the revised subset of the plurality of first educational content items.

13. The system of claim 12, wherein the user request comprises at least one of a search query pertaining to the educational content or navigation to a portion of an application associated with the educational content.

14. The system of claim 12, wherein the plurality of first educational content items comprise at least one of an application, a video, a book, or a web page.

15. The system of claim 12, wherein the at least one machine learning model comprises a machine learning model for each learning attribute for each of a plurality of learning levels, and wherein the learning attribute scores correspond to learning attributes comprising two or more of appeal, depth, sparkability, learning impact, or developmental appropriateness.

16. The system of claim 12, wherein the learning level of the user is based on at least one of user artifacts, user metrics, or manual user input of the learning level.

17. A non-transitory machine-readable storage medium storing instructions which, when executed, cause a processing device to perform operations comprising:
generating, using at least one machine learning model, learning attribute scores for learning attributes of each of a plurality of first educational content items corresponding to a request of a user for educational content, wherein the at least one machine learning model is trained using training inputs comprising a plurality of second educational content items and target outputs comprising learning attribute ratings of learning attributes of each of the plurality of second educational content items;
combining the learning attribute scores of each first educational content item to determine a comprehensibility ranking signal for a respective first educational content item, wherein the comprehensibility ranking signal is indicative of a comprehension level associated with the respective first educational content item;
determining a learning level of a user corresponding to the user request, wherein the learning level of the user is determined in response to receiving the request of the user for the educational content;
ranking the plurality of first educational content items based on a mapping between the learning level of the user and respective-comprehensibility ranking signals of the plurality of first educational content items;
providing a recommendation for presentation on a user interface (UI) of a user device of the user, the recommendation comprising a subset of the plurality of first educational content items identified according to the ranking of the plurality of first educational content items, wherein providing the recommendation comprises automatically installing the subset of the plurality of first educational content items provided via the UI of the user device;
identifying a change in the learning level of the user to a new learning level, wherein the new learning level is determined in response to at least one of: receiving user input indicating the new learning level, or detecting a change in an interest level of the user in the plurality of first educational content items;

determining a revised subset of the plurality of first educational content items based on a mapping between the new learning level of the user and the respective comprehensibility ranking signals of the plurality of first educational content items; and causing the UI of the user device of the user to be automatically updated with a revised recommendation comprising the revised subset of the plurality of first educational content items, wherein causing the UI of the user device of the user to be automatically updated comprises automatically uninstalling, or automatically updating the subset of first educational content items provided via the UI of the user device with the revised subset of the plurality of first educational content items.

18. The non-transitory machine-readable storage medium of claim 17, wherein the user request comprises at least one of a search query pertaining to the educational content or navigation to a portion of an application associated with the educational content.

19. The non-transitory machine-readable storage medium of claim 17, wherein the plurality of first educational content items comprise at least one of an application, a video, a book, or a web page.

20. The non-transitory machine-readable storage medium of claim 17, the operations further comprising modifying the ranking of the content items in response to identifying the change in the learning level of the user to the new learning level.

21. The non-transitory machine-readable storage medium of claim 17, wherein the at least one machine learning model comprises a machine learning model for each learning attribute for each of a plurality of learning levels, and wherein the learning attribute scores correspond to learning attributes comprising two or more of appeal, depth, sparkability, learning impact, or developmental appropriateness.

* * * * *